United States Patent [19]

Schafer

[11] Patent Number: 4,509,560
[45] Date of Patent: Apr. 9, 1985

[54] LOCKING DETENT FOR CORRUGATED TUBE

[75] Inventor: Gunter Schafer, Ft. Lauderdale, Fla.

[73] Assignee: Security Lumber & Supply Co., Bradley, Ill.

[21] Appl. No.: 545,189

[22] Filed: Oct. 25, 1983

[51] Int. Cl.³ ................................................ F16L 9/06
[52] U.S. Cl. ...................................... 138/122; 138/154
[58] Field of Search ............. 29/243.5, 243.52, 243.58, 29/283.5; 72/49, 50; 138/122, 154

[56] References Cited

U.S. PATENT DOCUMENTS

| | | | |
|---|---|---|---|
| 3,621,884 | 11/1971 | Trihey | 138/154 |
| 3,738,394 | 6/1973 | Westerbarkey | 138/122 |
| 3,858,421 | 1/1975 | Wood | 72/50 |
| 3,863,480 | 2/1975 | Meserole | 72/50 |
| 4,141,385 | 2/1979 | Siegwart | 138/122 |
| 4,377,188 | 3/1983 | Siegwart | 138/122 |

Primary Examiner—Stephen Marcus
Assistant Examiner—Mark Thronson
Attorney, Agent, or Firm—Wood, Dalton, Phillips, Mason, & Rowe

[57] ABSTRACT

A strip of longitudinally corrugated thin sheet metal is spirally coiled to form a tube with adjacent border portions of successive convolutions overlapping each other with at least one corrugation in the overlying border portion of one convolution fitting into one corrugation of the underlying border portion of an adjoining convolution, and the interfitting crests are provided with circumferentially spaced locking detents each of which has a flattened central area flanked by crimps along its marginal portions that extend downwardly and outwardly in substantial abutment with the lowermost portions of the crests in which the detents are located.

2 Claims, 4 Drawing Figures

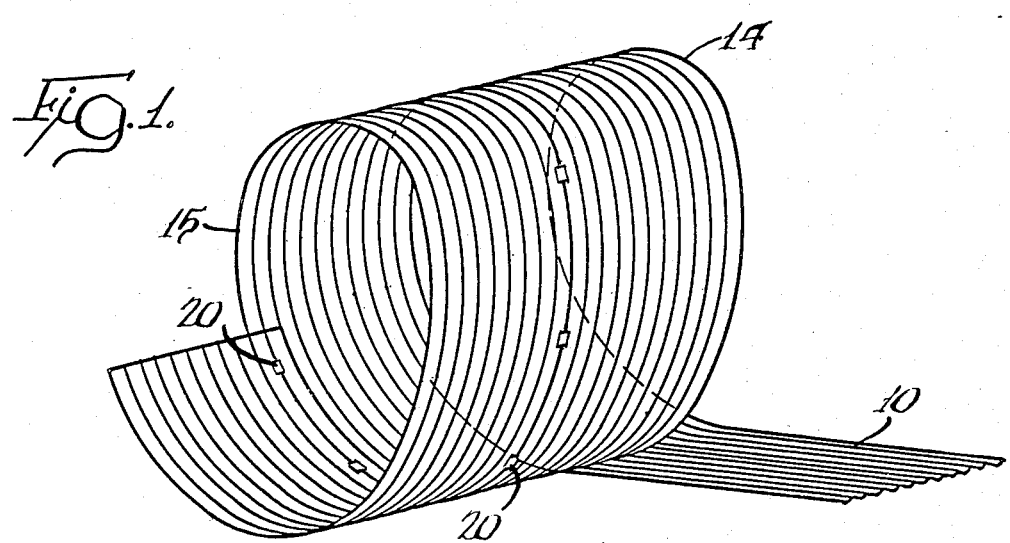
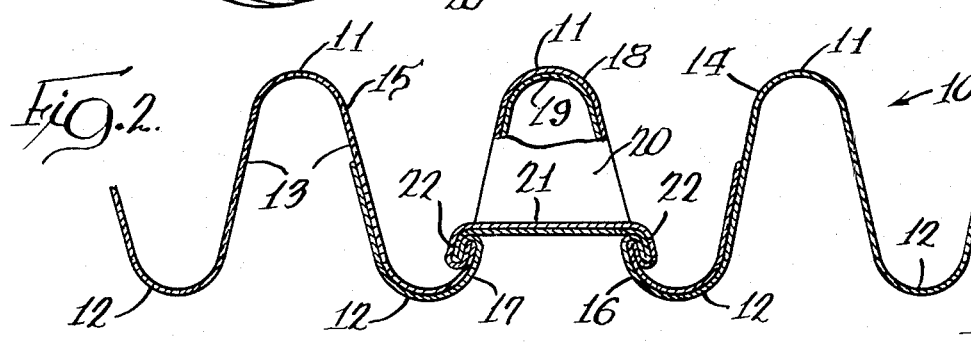
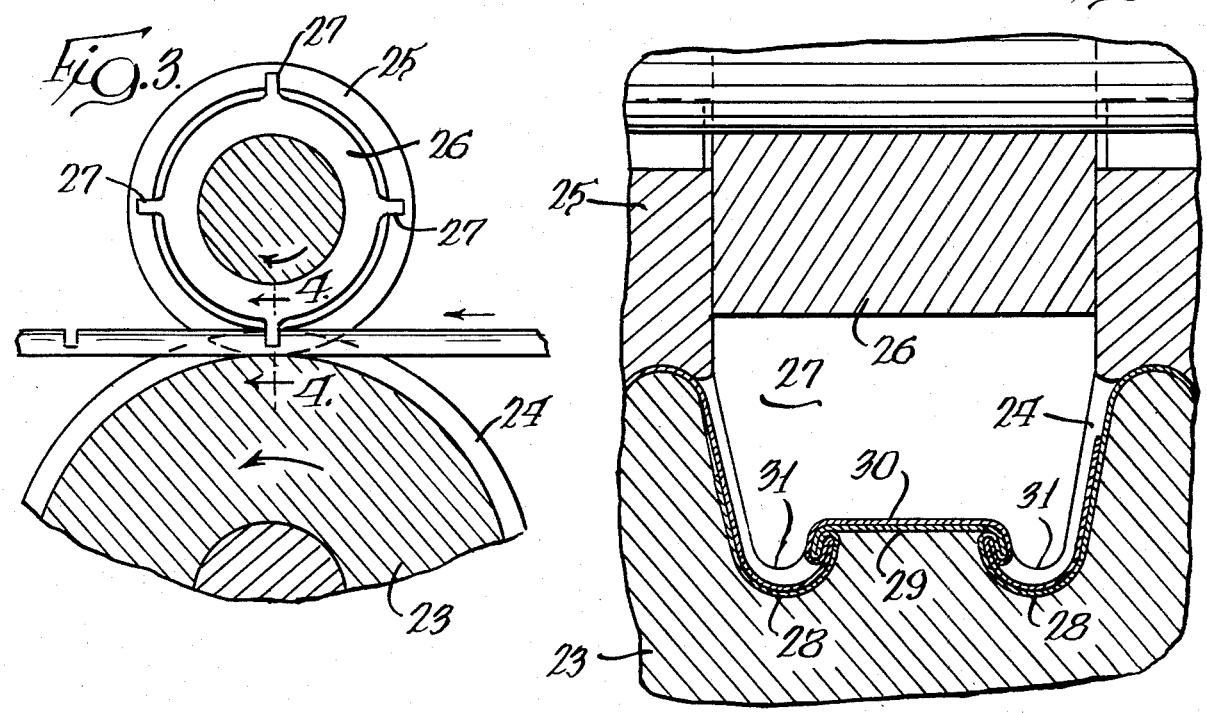

LOCKING DETENT FOR CORRUGATED TUBE

BACKGROUND OF THE INVENTION

The present invention relates to an improved flexible corrugated tube of the type disclosed in U.S. Pat. No. 4,141,385, issued Feb. 27, 1979 to Emil Siegwart.

The Siegwart patent discloses a flexible corrugated tube consisting of a succession of axially displaced convolutions of spirally coiled thin metal strip having longitudinally extending corrugations of wave form with alternating arcuate axially spaced crests and troughs. The overlapping border portions are secured together by detents which are spaced circumferentially along the crests of interfitting corrugations.

The detents disclosed in U.S. Pat. No. 4,141,385 are simply flattened areas in which parts of the crests are pushed down and spread out so as to overly the troughs at the two sides of the crest in which the detents are formed.

SUMMARY OF THE INVENTION

In accordance with the present invention, the overlapping border portions of successive tube convolutions are firmly locked to one another by detents each of which has a flattened central area flanked by crimps along the marginal portions of the central area that extend downwardly and outwardly therefrom substantially parallel to and closely adjacent the lowermost portion of the crests in which the detents are located, so the overlapping convolution border portions are firmly locked into one another in the crimps.

Preferably the crimps are substantially fully closed and substantially abut the lowermost portions of the crests in which the detents are located, so as to provide maximum locking strength tending to prevent separation of the overlapping border portions from one another.

THE DRAWINGS

FIG. 1 is a perspective view of a tube, partially formed, according to the invention;

FIG. 2 is an enlarged fragmentary sectional view with a part broken away, illustrating the locking detent of the invention;

FIG. 3 is a fragmentary sectional schematic view of a corrugated strip passing through apparatus in which the improved locking detent is formed; and FIG. 4 is an enlarged fragmentary sectional view taken substantially as indicated along the line 4—4 of FIG. 3.

DETAILED DESCRIPTION OF THE INVENTION

Referring to the drawings in detail, a strip 10 of longitudinally corrugated thin sheet metal, preferably aluminum, is provided with continuous longitudinal corrugations in the form of alternate curved crests 11 and troughs 12 which are seen in FIG. 2 to have sides 13 that form an angle of approximately 15° to the vertical with the opposite sides of each crest or trough being connected by an apex or a nadir that has a predetermined radius of curvature. In practice, the commercial strip may be 4 cm (about 1.57 inches) wide, and has twelve corrugations across its width.

A corrugated strip is formed into a flexible corrugated tube by passing it through a tube forming apparatus in which the strip is wound spirally into a succession of axially spaced convolutions 14 and 15, with a border portion 16 of the convolution 14 overlapping a border portion 17 of the convolution 15. As seen in FIG. 2, in the overlapping border portions 16 and 17 a crest 18 of the border portion 16 overlies and fits into a crest 19 of border portion 16. A plurality of circumferentially spaced detents 20 are formed in the crests 18 and 19 of the interfitting corrugations, and the interfitting corrugations have the wave form between the detents 20.

Each of the detents 20 has a flattened central area 21 flanked by crimps 22 which are along the marginal portions of the central area 21 and extend downwardly and outwardly therefrom substantially parallel to and closely adjacent the lowermost portions of the crests 18 and 19 in which the detents are located, so the overlapping convolution border portions 16 and 17 are firmly locked into one another in the crimps. In the preferred construction illustrated in FIG. 2, the crimps are substantially fully closed and substantially abut the lowermost portions of the crests in which the detents are located.

As seen in FIGS. 3 and 4, the detents 20 are formed by passing the overlapping border portions 16 and 17 between a lower roller 23 that rotates in the direction of the arrow in FIG. 3 and has a circumferential anvil groove 24, and an upper roller 25 that also rotates in the direction of the arrow in FIG. 3 and carries an idling crimping wheel 26 that has circumferentially spaced, radially extending, bifurcated crimping bosses 27 about its periphery.

As seen in FIG. 4, the anvil groove 24 has parallel hollows 28 that receive two adjacent troughs 12, and a flat-topped anvil 29 between the hollows 28 underlies the interfitting crests 18 and 19. The bifurcated crimping bosses 27 of the crimping wheel 26 have central die faces 30 that match the anvil ridge 29, and crimp forming lobes 31 at the two sides of the die face that project into the hollows 28 and are spaced outwardly from the sides of the anvil ridge 29.

Thus, as the overlapping border portions 14 and 15 of the strip 10 pass between the crimping rollers, the die face 30 presses the central area of the interfitting crests 18 and 19 against the anvil ridge 29 to form the flattened central area 21 of a detent 20, while the lobes 31 bend the parts of the overlapping crests 18 and 19 that flank the central area 21 downwardly around the sides of the anvil ridge 29 to form the crimps 22.

The foregoing detailed description is given for clearness of understanding only and no unnecessary limitations should be understood therefrom, as modifications will be obvious to those skilled in the art.

I claim:

1. In a flexible corrugated tube of the type that has a succession of axially displaced convolutions of spirally coiled thin metal strip having longitudinally extending corrugations, the corrugations being of wave form having alternating arcuate axially spaced crests and troughs, the border portions of successive tube convolutions overlapping each other with at least one corrugation in the overlying border portion of one convolution fitting into one corrugation of the underlying border portion of an adjoining convolution, and a plurality of circumferentially spaced detents in the crests of said interfitting corrugations with said interfitting corrugations having said wave form between said detents, the improvement comprising:

each of said detents has a flattened central area flanked by crimps along the marginal portions of said central area that extend downwardly and outwardly therefrom substantially parallel to a closely adjacent the lowermost portions of the crests in which said detents are located, so the overlapping convolution border portions are firmly locked into one another in said crimps.

2. The improvement of claim 1 in which the crimps along the marginal portions of the central area are substantially fully closed and substantially abut the lowermost portions of the crests in which the detents are located.

* * * * *